United States Patent [19]
Aikawa et al.

[11] 3,840,245
[45] Oct. 8, 1974

[54] HYDROPNEUMATIC TYPE SUSPENSION UNIT OF A MOTOR VEHICLE SUSPENSION SYSTEM

[75] Inventors: Hiroshi Aikawa; Naganori Ito, both of Tokyo, Japan

[73] Assignee: Nissan Motor Company Limited, Kanagawa-ku, Yokohama, Japan

[22] Filed: Dec. 7, 1972

[21] Appl. No.: 311,714

[30] Foreign Application Priority Data
Dec. 8, 1971   Japan................................ 46-98618

[52] U.S. Cl............................. 280/124 F, 267/65 D
[51] Int. Cl........................................... B60g 15/06
[58] Field of Search ........ 280/124 F, 112 R, 112 A, 280/6 R, 6 H, 6.1; 267/64 R, 64 A, 65 R, 65 D

[56] References Cited
UNITED STATES PATENTS
3,036,844   5/1962   Vogel................................ 267/64 R
3,250,526   5/1966   Kress................................ 280/124 F
3,592,485   7/1971   Buhl................................ 280/124 F Primary Examiner—Philip Goodman
Assistant Examiner—John A. Carroll

[57] ABSTRACT

A cylinder filled with fluid under pressure, a piston axially slidable in a cylinder chamber, and a piston rod extending externally of the cylinder. The piston rod has formed therein a second cylindrical chamber in which a second piston is slidably mounted. The total volume in the first-mentioned cylinder chamber and a hydropneumatic spring is varied in accordance with the load carried by the vehicle, so as not to vary the relative positions of the piston and the cylinder to thereby maintain a certain constant vehicle level. The suspension unit is further provided with valve and electric circuit means for controlling the amount of fluid in the second cylindrical chamber to provide vehicle level selection. The hydropneumatic spring unit absorbs variations in volume and pressure in the first-mentioned cylinder chamber resulting from road shocks without changing the selected vehicle level.

12 Claims, 3 Drawing Figures

HYDROPNEUMATIC TYPE SUSPENSION UNIT OF A MOTOR VEHICLE SUSPENSION SYSTEM

This invention relates to a suspension system of a motor vehicle and, more particularly, to an improved suspension unit of the hydropneumatic type forming part of the motor vehicle suspension system.

A hydropneumatic suspension unit is now in common use because of its ability to maintain a certain constant vehicle level regardless of the load carried and to have full control of the vehicle level selection. The known suspension unit usually comprises a cylinder mounted on the vehicle underbody structure, and a piston slidably received in the cylinder and mounted on a wheel axle, in which the selection of the desired vehicle level is accomplished by varying the position of the piston relative to the cylinder. However, in the case where a relatively high vehicle level is selected, there is a likelihood that after a road bump and during the extension, or rebound, of the unit the piston is caused to abut on the end of the cylinder, giving an intolerably hard ride. Another disadvantage of the known hydropneumatic suspension unit lies in the fact that due to its inherent construction the arrangement for maintaining a constant vehicle level has a relatively long response time.

This invention is based on the recognition that the above-mentioned disadvantages result from the fact that the two arrangements, i.e., the one for maintaining a constant vehicle level and the other for providing full control of vehicle level selection, share some components of the unit. In preferred embodiments of the present invention, the two arrangements of the suspension unit are provided separately so as not to interfere with each other.

It is an object of the present invention to provide an improved suspension unit of the hydropneumatic type with a view of eliminating the drawbacks inherent to the prior art apparatuses.

Another object of the present invention is to provide an improved suspension unit of the hydropneumatic type including an auxiliary piston and cylinder arrangement that permits selection of the desired vehicle level.

It is a further object of the present invention to provide an improved suspension unit of the hydropneumatic type including an electric control circuit that enables the selection of the desired vehicle level without requiring any troublesome operation.

It is still further object of the present invention to provide an improved suspension unit of the hydroneumatic type including rebound stoppers provided on the piston to provide a satisfactorily smooth ride.

In accordance with one preferred embodiment of the invvention, there is provided a suspension unit for a wheeled vehicle comprising a first cylinder having a first cylinder chamber, a cylinder head formed with inlet and outlet passageways, the inlet passageway communicating with a source of pressurized fluid for supplying the first cylinder chamber with pressurized fluid, a first piston axially slidable in the first cylinder chamber, a first piston rod projecting from the first piston and extending externally through one end of the first cylinder opposite to the cylinder head, first regulator means for selectively providing fluid communication between the cylinder chamber and the inlet passageway and between the cylinder chamber and the outlet passageway depending upon the fluid volume in the first cylinder chamber, the first regulator means comprising a free piston member axially slidable in the first cylinder chamber between the cylinder head and the first piston, spring means for urging free the piston member to a balanced and neutral position causing isolation of the cylinder chamber from the inlet and outlet passageways, the first cylinder chamber arranged to communicate with the inlet passageway when the first cylinder is moved relative to the first piston in one direction tending to shorten the suspension unit and with the outlet passageway when the first cylinder is moved relative to the first piston in the opposite direction tending to lengthen the suspension unit, a second cylinder provided in alignment with the first cylinder and having a second cylinder chamber, a second piston axially slidable in the second cylinder chamber, a second piston rod projecting from the second piston and extending externally through one end of the second cylinder, and second regulator means for regulating the amount of fluid in the second cylinder chamber to vary the length of the suspension unit and thus the height of the vehicle level. The inlet passageway in the cylinder head communicates with a source of pressurized fluid supplied to the first cylinder chamber. The first cylinder chamber is brought into communication with the inlet passageway when the first cylinder is moved relative to the first piston in one direction tending to shorten the suspension unit and with the outlet passageway when the first cylinder is moved relative to the first piston in the opposite direction tending to lengthen the suspension unit. The suspension unit in its entirety is connected at the cylinder head and at the second piston between an underbody structure and a wheel axle of the motor vehicle. The suspension unit may further comprise a hydropneumatic spring unit which is adapted to absorb vertical shocks of the vehicle wheel without changing for any substantial length of time the relative positions of the parts and elements of the suspension unit.

In accordance with another embodiment of the invention, a second cylinder is provided at the cylinder head of the first cylinder in alignment therewith and has a second cylinder chamber formed therein. A second piston is slidable within the second cylinder chamber to vary the length of the suspension unit, thereby permitting selection of the vehicle level.

Other objects and advantages of the suspension unit according to the invention will become apparent from the following description when read in conjunction with the accompanying drawings, in which.

Figure 1:
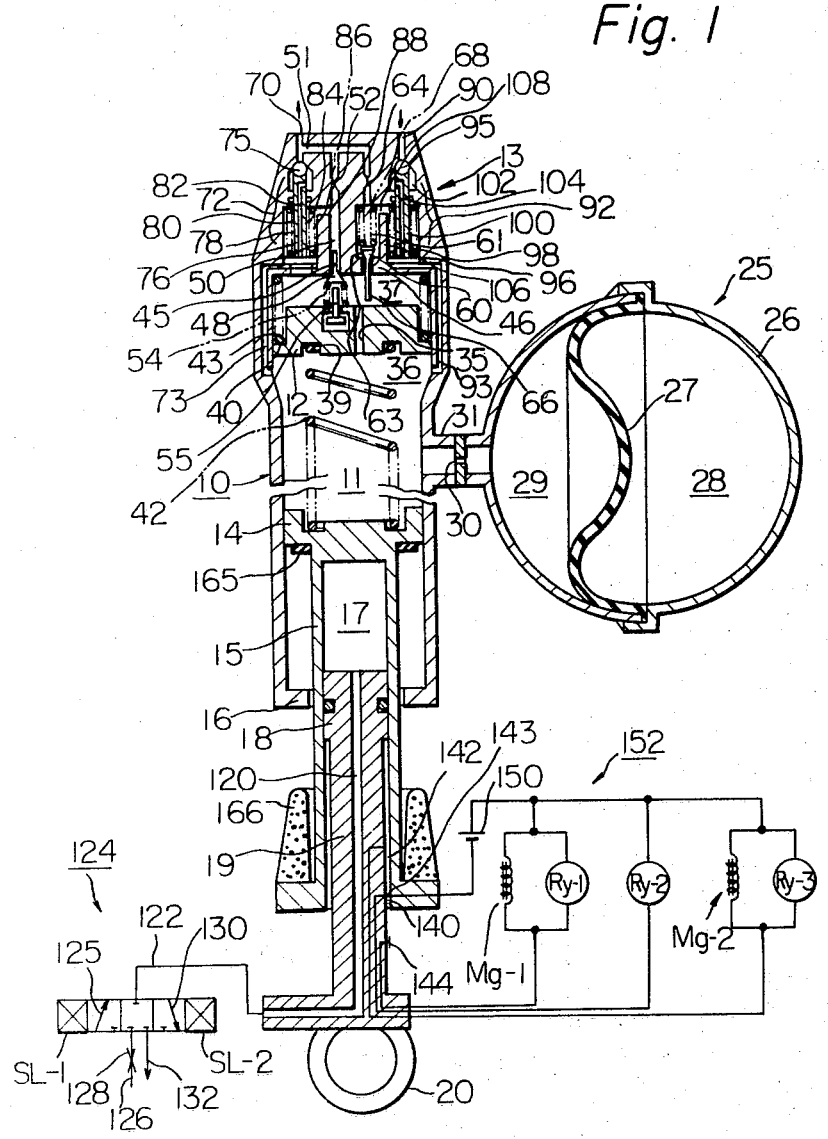
FIG. 1 is a longitudinal sectional view showing a preferred embodiment of the invention.

Referring now to FIG. 1, the suspension unit embodying the invention includes a cylinder 10 having a cylinder chamber 11 which comprises two axial portions of different inside diameters. A free piston member 12 is slidably mounted within the upper or greater-diameter portion of the cylinder chamber 11. The free piston member 12 cooperates with a regulator valve means 13 formed in the cylinder head, to maintain a certain constant vehicle level in a manner to be described later. A piston 14 is slidably mounted within the lower portion of the cylinder chamber 11. The piston 14 has an integrally formed piston rod 15 which extends downwardly and externally through a lower end wall or plug 16 of the cylinder 10. The piston rod 15 has an internally cylindrically formed chamber 17 for slidably receiving another piston 18. The piston 18 has its piston rod 19 extending downwardly and externally and, the piston rod 19 is provided at its leading end with a mounting eye 20 through which the piston rod 19 is connected to wheel supporting means such as a wheel axle (not shown). On the other hand, the cylinder 10 is connected at any suitable portion, preferably at the cylinder head, to an underbody structure (not shown) of the motor vehicle.

The suspension unit also includes a hydropneumatic spring unit 25 adapted to dampen oscillations fluid pressure and volume fluctuations in the cylinder chamber 11. The hydropneumatic spring unit 25 has a casing 26 which is internally divided by a flexible partition member 27 into two separate chambers 28 and 29. The chamber 28 is totally closed by the flexible partition member 27 and is filled with pressurized gas such as pressurized nitrogen gas. The other chamber 29 communicates with the cylinder chamber 11 through a restrictor 30 provided in a tube 31 connecting the hydropneumatic spring unit 25 to the cylinder 10. Not only the resiliency of the flexible partition member 27 but also the resistance to the movement of the fluid through the restrictor 30 imposes a drag on a change in the fluid pressure and volume, thus dampening out the oscillations in the fluid pressure and volume in the cylinder chamber 11.

The arrangement for maintaining a certain constant vehicle level regardless of the load carried, which is one feature of the present invention, will be described in detail hereinafter.

The free piston member 12 divides the chamber 11 into compartments 36 and 37 and includes a passage 35 for providing fluid communication between the two separate compartments 36 and 37. The free piston member 12 is formed with annular grooves 39 and 40 in the lower and upper surfaces, respectively, each serving as a spring seat. The annular groove 39 receives a spring 42 provided between the free piston member 12 and the piston 14, and the annular groove 40 receives a spring 43 mounted in the compartment 37. In response to a change in the load carried by the vehicle, the free piston member 12 moves upward and downward and eventually reaches a neutral position where an equilibrium is established between the upward and downward forces applied thereto by the springs 42 and 43, respectively.

The regulator valve means 13 includes two poppet valves 45 and 46 adapted to be opened and closed by movement of the free piston member 12. The poppet valve 45 includes a valve head member 48, the stem portion of which is movably received in a passage 50 leading to a drain passage 51 through a restrictor 52. The valve head member 48 is biased in an upward direction closing the passage 50, by a spring 54 mounted on the upper surface of the free piston 12. In order to allow a certain amount of play for the operation of the poppet valve 45, the free piston member 12 is provided with an elongate member 55 extending upwardly from the upper surface of the free piston member 12. The poppet valve 46 also includes a valve head member 60 which is movably mounted in a valve chamber 61 formed in the cylinder head of the cylinder 10. The valve chamber 61 communicates with the compartment 37 through a passage 63, and with the drain passage 51 through a restrictor 64. The valve head member 60 has its stem 66 extending through the passage 63 into the compartment 37 and is biased in a downward direction by a spring 68 mounted in the valve chamber 61, to normally block fluid communication between the valve chamber 61 and the compartment 37.

The drain passage 51, which leads to a drain or outlet port 70, communicates with the compartment 36 through a servo valve 72 and a passage 73, the compartment 36 being defined in the cylinder chamber 11 between the free piston member 12 and the piston 14 as described above. The serve valve 72 is of the type comprising a ball valve 75 which is adapted to be opened and closed by movement of a piston 76 slidably mounted in a valve chamber 78. The piston 76 has an integrally formed piston rod 80 which is internally formed with an axial passage 82 for providing fluid communication between a portion of the valve chamber 78 defined by the upper side of the piston 76 and a valve chamber 84 in which the ball valve 75 is accommodated. A spring 86 is mounted in the valve chamber 78 to bias the piston 76 in a downward direction opening the ball valve 75. The piston 76 is also biased in an upward direction by the fluid pressure transmitted through the passage 73. The valve chamber 78 communicates with the passage 50 through a passage 88.

The regulator valve means 13 further includes an inlet port 90 for feeding pressurized fluid into the cylinder chamber 11 from a source not shown. The inlet port 90 also communicates with the compartment 36 through a servo valve 92 and a passage 93. The servo valve 92 is of a similar type to the serve valve 72 and comprises a ball valve 95 and a piston 96. The piston 96 is slidably mounted in a valve chamber 98 and has an integrally formed piston rod 100 extending into a ball valve chamber 102. The piston rod 100 is internally formed with an axial passage 104 for providing fluid communication between the ball valve chamber 102 and a portion of the valve chamber 98 defined by the upper side of the piston 96. The piston 96 is biased in a downward direction by a spring 106 mounted in the valve chamber 98, and in an upward direction by the fluid pressure in the compartment 37 routed through the passage 93. The valve chamber 98 also communicates with the valve chamber 61 of the poppet valve 46 through a passage 108.

With this arrangement, if the vehicle load increases, the cylinder 10 is moved relative to the piston 14 in a direction causing the entire hydropneumatic suspension unit to telescope or shorten. This will mean that the piston 14 is moved upward assuming that the cylinder 10 is held stationary. When this occurs, the free piston member 12 is moved toward the cylinder head of the cylinder 10 by the action of the spring 42 against the action of the spring 43, causing the valve head member 60 of the poppet valve 46 to move upward. This movement of the valve head member 60 opens the poppet valve 46, thus feeding pressurized fluid in the compartment 37 and accordingly in the cylinder chamber 11 to the valve chamber 98 of the servo valve 92 through the passage 108. As a result, the piston 96 is moved downward by the action of the spring 106, opening the ball valve 95, since the fluid pressures exerted on both sides of the piston 96 are equal. At this time, working fluid is fed through inlet 90 and the servo valve 92 and the passage 93 into the cylinder chamber 11, resulting in increases in the fluid pressure and volume in the cylinder chamber 11. These increases in fluid pressure and volume in turn exert a force on the piston 14 tending to force it downward, and hence the free piston member 12 is moved downward to the neutral portion closing the poppet valve 46. The hydropneumatic spring unit 25 absorbs the increase in fluid volume. Upon closure of the poppet valve 46, the piston 96 is moved upward by the fluid pressure routed through the passage 93, thus blocking the feed of fluid through the ball valve 95 into the cylinder chamber 11. Eventually, the vehicle returns to its original level.

On the other hand, when the vehicle load decreases, the suspension unit of the invention extends or lengthens, which means that the piston 14 is moved downward, i.e., away from the cylinder head of the cylinder 10. This piston movement will move the free piston member 12 downward, causing the valve head member 48 of the poppet valve 45 to move downward. Then, the poppet valve 45 is opened, permitting the fluid pressure in the compartment 37 and accordingly in the cylinder chamber 11 to be transmitted through the passages 50 and 88 into the valve chamber 78 of the servo valve 72. Since the fluid pressures exerted on both sides of the piston 76 are equal, it is moved downward by the force of the spring 86, opening the ball valve 75. Upon opening of the ball valve 75, some fluid is drained from the cylinder chamber 11 through the passage 73, the servo valve 72 and the drain port 70, resulting in decreased fluid pressure and volume in the cylinder chamber 11. This pressure drop and reduced volume will cause the piston 14 and accordingly the free piston member 12 to move upward to their neutral positions, closing the poppet valve 45. Closure of the poppet valve 45 will cause the servo valve 72 to be closed to prevent further drain of pressurized fluid. Thus the vehicle returns to its original level. As will be appreciated from the above, the free piston member 12 and the regulator valve means 13 cooperate with each other to maintain a certain constant vehicle level regardless of the load carried.

In this connection, it should be noted that the free piston member 12 and the springs 42 and 43 are so arranged that when the vehicle is travelling on a bumpy road, the free piston member 12 does not follow the rapid movements of the piston 14 resulting from road bumps to such an extent as to actuate the poppet valve 45 and 46. In the suspension unit of the present invention, shocks caused by road bumps are absorbed by the hydropneumatic spring unit 25 acting as a shock absorber.

Another feature of the present apparatus lies in the fact that it is possible to adjust the vehicle level to a plurality of predetermined values without requiring any troublesome operation. The construction and operation of the arrangement for performing such function will be described in detail hereinafter.

As shown, the piston 18 has formed therein an axial passage 120 which opens to the cylinder chamber 17 formed in the piston rod 15. The axial passage 120 is connected through a conduit 122 to a schematically shown solenoid valve arrangement 124. The solenoid valve arrangement 124 includes two solenoids SL-1 and -2 which are adapted to be energized by a vehicle level selection circuit shown in FIG. 2. When the solenoid SL-1 is energized, the valve arrangement moves in a right-hand direction as viewed in FIG. 1 to communicate the conduit 122 through a passage 125 with a pressure line 126. The pressure line 126 is connected to the source of pressurized fluid (not shown) and includes a unidirectional or check valve 128 provided therein. On the other hand, upon energization of the solenoid SL-2, the valve arrangement 124 is moved in a left-hand direction to connect the conduit 122 through a passage 130 to an exhaust or drain line 132, permitting draining of fluid from the cylinder chamber 17 formed in the piston rod 15.

The piston rod 15 has attached thereto a contact 140 which, in the illustrated embodiment, is positioned on a lower portion of the wall of the cylinder chamber 17. Three axially spaced contacts 142, 143 and 144 are mounted on the outer surface of the piston rod 19 in such a manner that when the piston 18 is moved relative to the piston rod 15, the contacts 142, 143 and 144 are in turn brought into electrical contact with the contact 140. The locations of the contacts 142, 143 and 144 on the piston rod 19 depend upon the predetermined high, intermediate and low vehicle levels, respectively.

The contact 140 is connected to a battery 150 forming part of a vehicle level detection circuit, as generally designated by 152. The battery 150 is connected to a parallel combination of a relay Ry-1 and an electromagnetic coil Mg-1, which in turn is connected to the contact 144. Another relay Ry-2 is connected at one end to the battery 150 and at the other to the contact 143. Similarly, another parallel combination of a relay Ry-3 and an electromagnetic coil Mg-2 is connected between the battery 150 and the contact 142. As will be understood, these relays and electromagnetic coils are energized when the vehicle level reaches the corresponding values.

Figure 2:
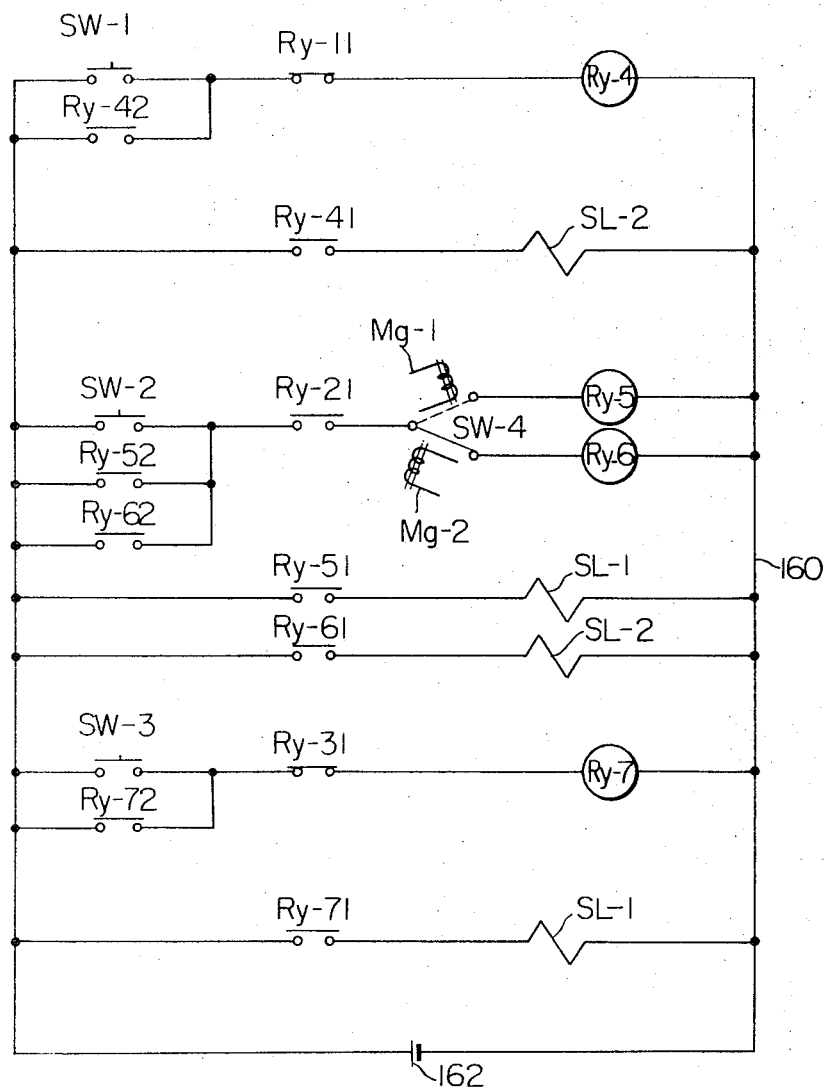
FIG. 2 is a circuit diagram showing a typical example of the vehicle level selection circuit.

Referring to FIG. 2, the vehicle level selection circuit as shown comprises three normally open switches Sw-1, -2 and -3 which are adapted to be manually actuated for selection of the vehicle level. These normally open switches Sw-1, -2 and -3 are connected to normally closed contacts Ry-11, -21 and -31 of the relays Ry-1, -2 and -3, respectively. The normally closed contacts Ry-11 and -31 are connected to relays Ry-4 and -7, respectively, which in turn are connected to a line 160 leading to a battery 162. The normally closed contact Ry-21 of the relay Ry-2 is connected to a movable contact of a change-over switch SW-4, the two fixed contacts of which are connected to the line 160 through relays Ry-5 and -6, respectively. The change-over switch SW-4 is operatively associated with the electromagnetic coils Mg-1 and -2 in such a manner as to selectively connect the normally closed contact Ry-21 to the relay Ry-5 or -6 upon energization of Mg-1 or -2, respectively. The change-over switch SW-4 is of the character that it remains in one position until the electromagnetic coil associated with the other position is energized.

As shown, the relays Ry-4, -5, -6 and -7 have their normally open contacts Ry-41, -51, -61 and -71 connected in series with the solenoids SL-1 and SL-2 across the battery 162. The normally open contacts Ry-42 and -72 of the relays Ry-4 and -7 are connected across the switches SW-1 and -3, respectively, and the normally open contacts Ry-52 and -62 are connected in parallel across the switch SW-2. Once their corresponding relays are energized, normally open contacts Ry-42, -52, -62 and -72 are maintained closed until the relays are de-energized.

Let it be assumed that the piston 18 is moved from the high predetermined vehicle-level position in which the contact 140 engages the contact 142, to the intermediate predetermined vehicle-level position, shown in FIG. 1, in which the contact 140 engages the contact 143. This piston movement will energize the relay Ry-2 to cause the normally closed contact Ry-21 to open. In this case, the switch SW-4 remains in the position indicated by a solid line to connect the contact Ry-21 to the relay Ry-6, as een in FIG. 2.

Where the low predetermined vehicle level is desired, the vehicle operator is required only to actuate the switch SW-1. Upon actuation of SW-1, the relay Ry-4 is energized, so that the normally open contacts Ry-41 and -42 are closed. Since, as described above, those contacts Ry-41 and -42 are of the selfsustaining charactor, the relay Ry-4 and the solenoid SL-2 continue to be energized even after the switch SW-1 is released. With the energization of the solenoid SL-2, the solenoid valve arrangement 124 is moved in a left-hand direction as viewed in FIG. 1, connecting the conduit 122 through the passage 130 to the exhaust line 132. Thus, the fluid in the cylindrical chamber 17 is exhausted, causing the piston 18 to gradually move upward, i.e., toward the piston 14, whereby a lower vehicle level is obtained.

When the piston 18 reaches the low predetermined vehicle level position in which the contact 140 engages the contact 144, the relay Ry-1 is energized to cause the normally closed contact Ry-11 to open, so that the relay Ry-4 is de-energized. Simultaneously, the electromagnetic coil Mg-1 is energized to change the switch SW-4 to the position indicated by a broken line, in which it connects the normally closed contact Ry-21 to the relay Ry-5. With the relay Ry-4 de-energized, the contacts Ry-41 and -42 are opened to de-energize the solenoid SL-2, so that the solenoid valve arrangement 124 returns to its neutral position as shown. The valve arrangement 124, in this neutral position, prevents drain of the fluid from the cylinder chamber 17, whereby the vehicle is maintained at the low predetermined level.

Where it is desired to raise the vehicle from the intermediate predetermined level to the high predetermined level, the switch SW-3 is actuated to energize the relay Ry-7. This will cause the normally open contacts Ry-21 and -72 to be closed, energizing the solenoid SL-1. With the solenoid SL-1 energized, the solenoid valve arrangement 124 is moved in a right-hand direction to the position in which the conduit 122 communicates with the pressure line 126 through the passage 125. When this occurs, the fluid under pressure is fed through the valve arrangement 124 into the cylindrical chamber 17 to cause the piston 18 to move downward, i.e., away from the piston 14. Thus, the vehicle is gradually lifted until the piston 18 reaches the high predetermined vehicle-level position in which the contact 142 engages the contact 140.

When the contact 142 engages the contact 140, the relay Ry-3 and the electromagnetic coil Mg-2 are energized, causing the contact Ry-31 to be de-energized. This will de-energize the relay Ry-7 and accordingly open the contacts Ry-71 and -72, thereby de-energizing the solenoid SL-1. Upon de-energization of SL-1, the valve arrangement 124 returns to the neutral position as shown, shutting off the feed of fluid into the cylindrical chamber 17. Thus, the vehicle is maintained at the high predetermined level. In addition, upon energization of the electromagnetic coil Mg-2, the switch SW-4 is changed to the position indicated by the solid line, in which it connects the normally closed contact Ry-21 to the relay Ry-6.

Where the intermediate predetermined vehicle level is desired, the vehicle operator is required to actuate the switch SW-2. The actuation of the switch SW-2 will energize the relay Ry-5 or -6 to close the normally open contact Ry-52 or -62. Whether it is the relay Ry-5 or -6 that is energized depends upon the particular level at which the vehicle is maintained before adjustment, i.e., the low or high predetermined vehicle level. If the relay Ry-5 is energized, then the normally open contact Ry-51 is closed to energize the solenoid SL-1. On the other hand, if the relay Ry-6 is energized, the normally open contact Ry-61 is closed to energize the solenoid SL-2. Upon energization of SL-1 or -2, the solenoid valve arrangement 124 is moved in right-hand or left-hand direction to increase or decrease the amount of fluid in the cylindrical chamber 17.

When the piston 18 reaches the intermediate predetermined vehicle-level position in which the contact 143 engages the contact 140 on the piston rod 15, the relay Ry-2 is energized, causing the contact Ry-21 to open. As a result, the relay Ry-5 or -6 is de-energized to open the contact Ry-51 or -61, thereby de-energizing the solenoid SL-1 or -2. This will move the solenoid valve arrangement 124 to the neutral position, so that the vehicle is maintained at the intermediate predetermined level. With the arrangement shown, it is possible to adjust the vehicle level to any one of the three predetermined values by merely actuating the switch corresponding to the desired vehicle level.

The suspension unit according to the invention further comprises a rebound dampener or cushion 165 provided on the piston 14 to eliminate an intolerably hard ride which would otherwise be experienced when the piston is brought to abut on the end of the cylinder 10. In this embodiment, also a rubber bumper 166 is provided on the piston rod 15 to provide a more satisfactory ride.

Figure 3:
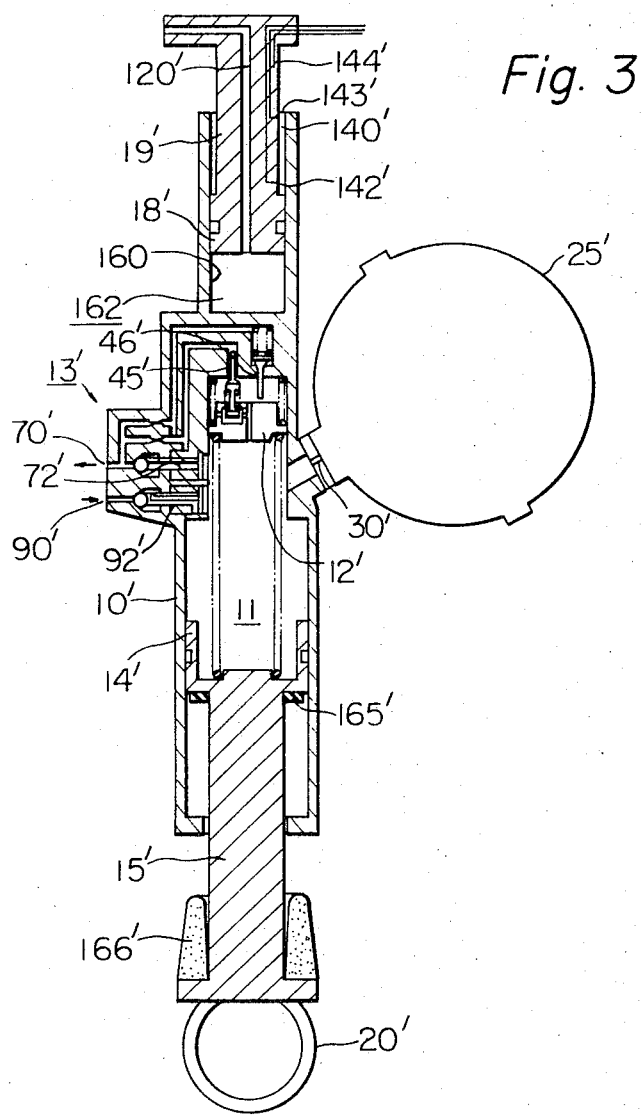
FIG. 3 is a view similar to FIG. 1, but showing a modification of the suspension unit of the invention.

Referring to FIG. 3, there is illustrated a modified form of the hydropneumatic suspension unit according to the invention, in which like reference numerals designate like structural parts with a prime (') added.

The hydropneumatic suspension unit as shown includes a cylinder 160 having a cylinder chamber 162 which functions in the same manner as the cylinder chamber 17 formed in the piston rod 15 of FIG. 1. The cylinder 160 is of a somewhat smaller size than a cylinder 10' and is provided at the cylinder head of the cylinder 10' in alignment therewith. A piston 18' is slidably mounted within the cylinder chamber 162. The piston 18' also has formed therein an axial passage 120' which extends through the rod 19' and opens to the cylinder chamber 162 defined by the lower end of the piston 18'. The axial passage 120' is connected to a solenoid valve arrangement (not shown), and the rod 19' of the piston 18' has attached thereto three contacts 142', 143' and 144' which are selectively engaged by a contact 140' provided on the inner wall of the cylinder 160. The piston rod 19' is connected by any suitable means to the underbody structure of the vehicle (not shown). On the other hand, a piston rod 15' of a piston 14' slidably received in the cylinder 10' is connected by a mounting eye 20' to a wheel axle (not shown). Another difference of the hydropneumatic suspension unit of the modified form as shown lies in the fact that a major portion of a regulator valve means 13' is provided in the side wall of the cylinder 10'. The suspension unit of this embodiment functions in the same manner as that shown in FIG. 1 to maintain a desired constant vehicle level and to provide full control of vehicle level selection.

Although the invention has been described by embodiments in which three different vehicle levels are selectable, it will be appreciated that the suspension unit can be modified to have two or more than three selectable vehicle level position, without departing from the true scope of the invention which is defined by the appended claims.

What is claimed is:

1. A suspension unit for a wheeled vehicle comprising a first cylinder connected to a body of said vehicle and having a first cylinder chamber filled with pressurized fluid and a cylinder head formed with inlet and outlet passageways, said inlet passageway communicating with a source of pressurized fluid for supplying said first cylinder chamber with pressurized fluid, a first axially slidable piston in said first cylinder chamber, a first piston rod projecting from said first piston and extending externally through one end of said first cylinder opposite to said cylinder head, first regulator means for selectively providing fluid communication between said first cylinder chamber and said inlet passageway and between said first cylinder chamber and said outlet passageway depending upon the fluid volume in said first cylinder chamber, said first regulator means comprising a free piston axially slidable in said first cylinder chamber between said cylinder head and said first piston, and spring means for urging said free piston to a balance and neutral position causing isolation of said first cylinder chamber from said inlet and outlet passageways, said first cylinder chamber arranged to communicate with said inlet passageway when said first cylinder is moved relative to said first piston in one direction tending to shorten said suspension unit and with said outlet passageway when said first cylinder is moved relative to said first piston in the opposite direction tending to lengthen said suspension unit, a second cylinder formed on said first piston rod in alignment with said first cylinder and having a second cylinder chamber filled with pressurized fluid, a second piston axially slidable in the second cylinder chamber, a second piston rod projecting from said second piston and extending externally through one end of said second cylinder and mounted on a wheel supporting means of said vehicle, and second regulator means for regulating the amount of pressurized fluid in the second cylinder chamber to vary the length of said suspension unit and thus the height of the vehicle level.

2. A suspension unit as claimed in claim 1, further comprising a hydropneumatic spring unit having a casing which is divided by a flexible partition member into a gas chamber filled with gas under pressure and a fluid chamber communicating with said first cylinder chamber through a restrictor.

3. A suspension unit as claimed in claim 1, in which said first regulator means further comprises a first servo valve for controlling fluid communication between said inlet passageway and said first cylinder chamber, a second servo valve for controlling fluid communication between said outlet passageway and said first cylinder chamber, a first poppet valve cooperating with said free piston to open said first servo valve when said free piston is moved in said one direction, and a second poppet valve cooperating with said free piston to open said second servo valve when said free piston is moved in the opposite direction.

4. A suspension unit as claimed in claim 1, in which said spring means comprises a first spring for urging said free piston in said one direction, said first spring being provided between said first piston and said free piston, and a second spring for urging said free piston in the opposite direction, said second spring being provided between said cylinder head and said free piston.

5. A suspension unit as claimed in claim 1, in which said second piston rod is formed with an axial passage extending through said second piston rod through which pressurized fluid is fed formed a source of pressurized fluid into said second cylinder chamber.

6. A suspension unit as claimed in claim 1, in which said second regulator means comprises a solenoid valve arrangement having a first position to provide fluid communication between the second cylinder chamber and said source of pressurized fluid, a second position to permit exhaust of fluid from said second cylinder chamber and a neutral position to isolate said second cylinder chamber from said source of pressurized fluid while preventing exhaust of fluid therefrom.

7. A suspension unit as claimed in claim 6, further comprising a vehicle level detection circuit including a contact provided on a side wall of said second cylinder chamber and a plurality of axially spaced contacts provided on said second piston rod, said plurality of axially spaced contacts being arranged to engage in turn said contact on said wall of said second chamber when the vehicle reaches their corresponding predetermined vehicle levels.

8. A suspension unit as claimed in claim 7, further comprising a vehicle level selection circuit connected to said vehicle level detection circuit and said solenoid valve arrangement, said vehicle level selection circuit being operable to actuate said solenoid valve arrangement so as to contain in the second cylinder chamber the amount of pressurized fluid corresponding to a selected vehicle level.

9. A suspension unit as claimed in claim 1, further comprising a rebound dampener provided on said first piston to prevent said first piston from abutting on an end wall of said first cylinder.

10. A suspension unit for a wheeled vehicle comprising a cylinder connected to a body of said vehicle and having a first fluid chamber filled with pressurized fluid, a first piston axially slidable in said first fluid chamber, a first piston rod connected to said first piston and having formed therein a second fluid chamber filled with pressurized fluid, first vehicle level regulating means selectively providing communication between said first fluid chamber and a source of pressurized fluid and between said first fluid chamber and a reservoir in response to variation in the weight and/or load of said vehicle thereby maintaining the effective length of said suspension unit at a substantially constant value independently of the weight and/or load of said vehicle, a second piston axially slidable in said second fluid chamber, a second piston rod connected to said second piston and mounted on a wheel supporting means of said vehicle, and second vehicle level regulating means selectively providing communication between said second fluid chamber and a source of pressurized fluid and between said second fluid chamber and a reservoir thereby varying the effective length of said suspension unit.

11. A suspension unit for a wheeled vehicle comprising a first cylinder having a first fluid chamber filled with pressurized fluid and having formed at one end thereof a second cylinder which is in alignment with said first cylinder and which has a second fluid chamber filled with pressurized fluid, a first piston axially slidable in said first fluid chamber, a first piston rod connected to said first piston and mounted on a wheel supporting means of said vehicle, first vehicle level regulating means selectively providing communication between said first fluid chamber and a source of pressurized fluid and between said first fluid chamber and a reservoir in response to variation in the weight and/or load of said vehicle thereby maintaining the effective length of said suspension unit at a substantially constant value independently of the weight and/or load of said vehicle, a second piston axially slidable in said second fluid chamber, a second piston rod connected to said second piston and to a body of said vehicle, and second vehicle level regulating means selectively providing communication between said second fluid chamber and a source of pressurized fluid and between said second fluid chamber and a reservoir thereby varying the effective length of said suspension unit.

12. A suspension unit for a wheeled vehicle comprising a first cylinder having a first cylinder chamber filled with pressurized fluid and a cylinder head formed with inlet and outlet passageways, said inlet passageway communicating with a source of pressurized fluid for supplying said first cylinder chamber with pressurized fluid, a first piston axially slidable in said first cylinder chamber, a first piston rod projecting from said first piston and extending externally through one end of said first cylinder opposite to said cylinder head and mounted on a wheel supporting means of said vehicle, first regulator means for selectively providing fluid communication between said first cylinder chamber and said inlet passageway and between said first cylinder chamber and said outlet passageway depending upon the fluid volume in said first cylinder chamber, said first regulator means comprising a free piston axially slidable in said first cylinder chamber between said cylinder head and said first piston, and spring means for urging said free piston to a balanced and neutral position causing isolation of said first cylinder chamber from said inlet and outlet passageways, said first cylinder chamber arranged to communicate with said inlet passageway when said first cylinder is moved relative to said first piston in one direction tending to shorten said suspension unit and with said outlet passageway when said first cylinder is moved relative to said first piston in the opposite direction tending to lengthen said suspension unit, a second cylinder formed on said cylinder head of said first cylinder in alignment with said first cylinder and having a second cylinder chamber filled with pressurized fluid, a second piston axially slidable in the second cylinder chamber, a second piston rod projecting from said second piston and extending externally through one end of said second cylinder and connected to a body structure of said vehicle, and second regulator means for regulating the amount of pressurized fluid in the second cylinder chamber to vary the length of said suspension unit and thus the height of the vehicle level.

* * * * *